(12) United States Patent
Chacon et al.

(10) Patent No.: US 6,473,721 B1
(45) Date of Patent: Oct. 29, 2002

(54) FACTORY TRAFFIC MONITORING AND ANALYSIS APPARATUS AND METHOD

(75) Inventors: Guillermo Rodolfo Chacon; Mitsuru Hirotani; Alberto Castano-Pardo, all of San Antonio, TX (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/422,514

(22) Filed: Oct. 21, 1999

Related U.S. Application Data

(60) Provisional application No. 60/105,590, filed on Oct. 26, 1998.

(51) Int. Cl.[7] ................................................. G07C 3/14
(52) U.S. Cl. ........................................ 702/182; 702/177
(58) Field of Search ........................ 702/33–35, 81–84, 702/108, 113, 128, 129, 176–185, 187, 188; 700/100, 102, 103, 111

(56) References Cited

U.S. PATENT DOCUMENTS

| | | | | |
|---|---|---|---|---|
| 4,089,056 A | * | 5/1978 | Barna et al. | 700/111 |
| 4,956,784 A | * | 9/1990 | Hadavi et al. | 700/102 |
| 5,446,671 A | * | 8/1995 | Weaver et al. | 700/100 |
| 5,721,686 A | * | 2/1998 | Shahraray et al. | 700/102 |
| 5,777,896 A | * | 7/1998 | Arita et al. | 340/3.43 |
| 5,946,661 A | * | 8/1999 | Rothschild et al. | 377/16 |

OTHER PUBLICATIONS

Leachman, Robert C, "Closed–Loop Measurement of Equipment Efficiency and Equipment Capacity", IEEE/SEMI Advanced Semidconductor Manufacturing Conference. 1995, pp. 115–126.*

* cited by examiner

*Primary Examiner*—Marc S. Hoff
*Assistant Examiner*—Manuel L. Barbee
(74) *Attorney, Agent, or Firm*—Frommer Lawrence & Haug LLP; William S. Frommer; Gordon Kessler

(57) ABSTRACT

A factory traffic monitoring and analysis apparatus and method that may be used as both a real-time monitor of factory traffic intensity and variability, and as a predictor of factory congestion and lead time. The system constructed in accordance with the invention provides both descriptive and prescriptive information to enable improved factory performance. The system helps to identify actual and potential capacity constrained stations or with high traffic variability. Increasing capacity or reducing variability on stations within the factory identified by the system will allow increased product output and shorter manufacturing lead time.

20 Claims, 4 Drawing Sheets

FACTORY TRAFFIC MONITORING AND ANALYSIS APPARATUS AND METHOD

CROSS-REFERENCE TO RELATED APPLICATIONS

This application claims the benefit of U.S. Provisional Patent Application Ser. No. 60/105,590, filed Oct. 26, 1998.

BACKGROUND OF THE INVENTION

This invention relates generally to a factory traffic monitoring and analysis apparatus and method, and more particularly to a factory traffic monitoring and analysis apparatus and method that may be used as both a real-time monitor of factory traffic intensity and variability, and as a predictor of factory congestion and lead time.

Factory performance such as is measured by manufacturing lead time and product output is greatly affected by traffic variation and traffic intensity. While this is a well known fact, it is often difficult to determine where one's efforts at reducing manufacturing lead time and increasing product output should be focused within a factory in order to gain the greatest improvement. Manufacturing engineers have long observed that heavily loaded systems characterized by high variability in times at which jobs arrive for processing and actual processing times typically exhibit poor performance, measured by high cycle times and large in-process inventories. This phenomenon has been explained analytically using results from the theory of queues (waiting lines). However, this explanation has been largely unsatisfactory in monitoring and predicting manufacturing performance. Therefore it would be beneficial to provide an improved system for monitoring and predicting manufacturing performance.

OBJECTS OF THE INVENTION

Accordingly, it is an object of the invention to provide an improved factory traffic monitoring and analysis apparatus and method.

Another object of the invention is to provide an improved factory traffic monitoring and analysis apparatus and method that may be used as both a real-time monitor of factory traffic intensity and variability, and as a predictor of factory congestion and lead time.

A further object of the invention is to provide an improved factory traffic monitoring and analysis apparatus and method that provides both descriptive and prescriptive information to enable improved factory performance.

Yet another object of the invention is to provide an improved factory traffic monitoring and analysis apparatus and method that identifies actual and potential capacity constrained stations or with high traffic variability, and aids in increasing capacity or reducing variability on stations within the factory identified by the system, thus allowing increased product output and shorter manufacturing lead time.

Still other objects and advantages of the invention will in part be obvious and will in part be apparent from the specification and the drawings.

SUMMARY OF THE INVENTION

Generally speaking, in accordance with the invention, a factory traffic monitoring and analysis apparatus and method is provided that may be used as both a real-time monitor of factory traffic intensity and variability, and as a predictor of factory congestion and lead time. The system constructed in accordance with the invention provides both descriptive and prescriptive information to enable improved factory performance. The system helps to identify actual and potential capacity constrained stations or stations with high traffic variability. Increasing capacity or reducing variability on stations within the factory identified by the system will allow increased product output and shorter manufacturing lead time.

If a future change in a production system or its input is expected or desired, the apparatus and method constructed in accordance with the invention can at least roughly predict the impact of such a change on factory performance before a full commitment to such a change is endorsed, and factory equipment and manpower are employed. Thus, the apparatus and method constructed in accordance with the invention provides both descriptive and prescriptive information to an operator of a factory, or the like, that will enable improved factory performance.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

The relationship between performance measures (cycle time and Work-In-Process (WIP)) and traffic parameters (mean and variance of interarrival times and service times) obtained from steady-state queuing network models provides the basis for both an empirical and an analytical model element of the factory traffic monitoring and analysis apparatus and method constructed in accordance with the invention.

Figure 1:
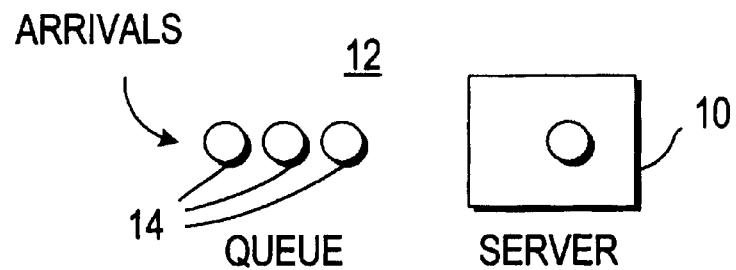
FIG. 1 is a depiction of a single server node with a queue.

Referring first to FIG. 1, two important relationships will be described. FIG. 1 depicts a single server 10, a single queue 12 consisting of a plurality of arriving jobs 14 (an arrival stream of jobs). Thus, queue 12 acts as a storage space where jobs await processing. Jobs 14 are served sequentially from queue 12 in the order in which they arrive, and are appended to the arrival end of queue 12 upon arrival. For a system such as this, a fundamental relationship known as Little's Law holds. Little's Law states that the mean occupancy (number of jobs in or waiting for service) (L) equals the arrival rate of jobs (λ) multiplied by the mean cycle time of jobs (W), or L=λ×W. Little's law specifies a linear relationship between mean occupancy and mean cycle time, and thus one can be thought of as a scaled version of the other with the scaling factor being equal to the arrival rate. Once a system has reaches steady state, λ is also departure rate or throughput.

Figure 2:
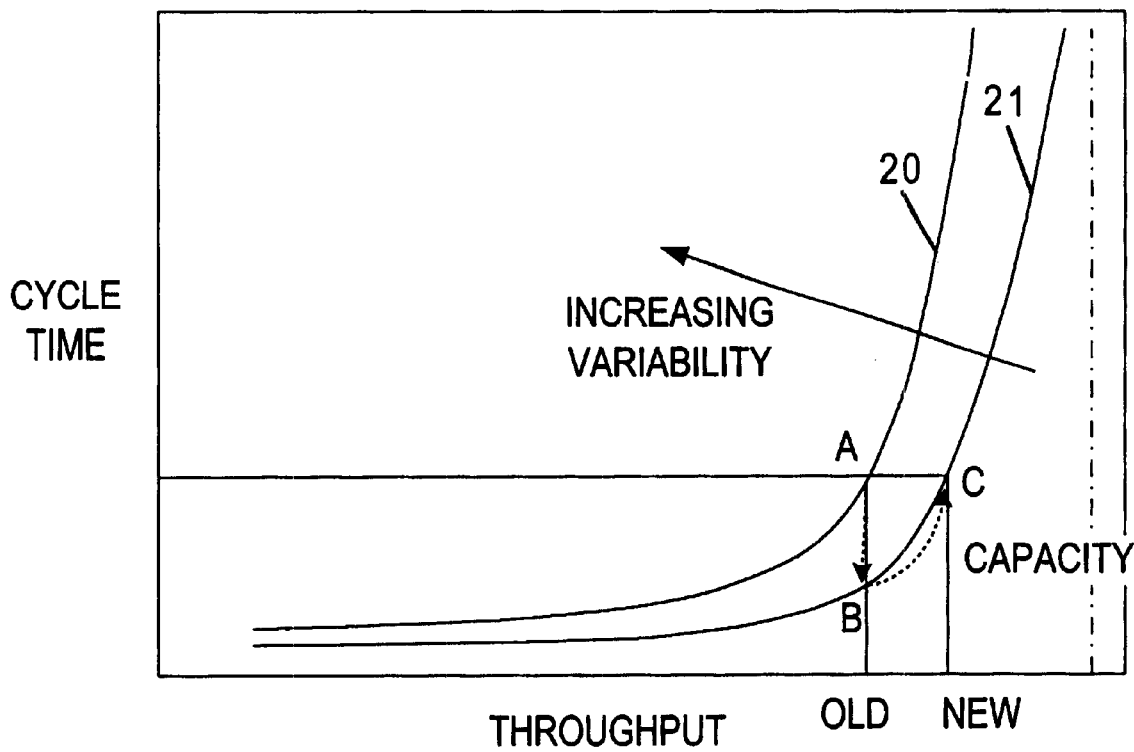
FIG. 2 is a graph depicting the recovery of hidden capacity by reducing variability.

A second fundamental relationship relating to such a system is known as the Kingman diffusion approximation, and will be explained making reference to FIG. 2. FIG. 2 depicts the relationship between mean server time vs. throughput. Throughput (λ) is traffic intensity (the ratio of mean service time to mean interarrival time) multiplied by the service rate (u). Traffic intensity is a measure of server utilization (or alternatively, service capacity) and must remain less than one in the long term for any queue to be stable. FIG. 2 highlights both the relationship between capacity (measured by traffic intensity multiplied by service rate) and mean cycle time and the relationship between variability in job arrival times and job service times and mean cycle times. Thus, in FIG. 2, throughput is represented on the x-axis and mean cycle time is represented on the y-axis. Each curve 20, 21 depicts a relationship between these two variables, represented as production capacity, the capacity at curve 21 being greater than the capacity at curve 20 for each combination of throughput and mean cycle time.

As is further shown in FIG. 2, if capacity is represented by curve 20, and throughput and mean cycle time cross curve 20 at point A, by reducing variability, mean cycle time is similarly reduced, capacity moves to curve 21, and throughput remains the same. Throughput and mean cycle time then cross curve 21 at point B. Thus, variability and mean cycle time are reduced while throughput remains the same. Similarly, if mean cycle time is maintained at its point A level, and variability is similarly reduced, capacity also moves out from curve 20 to curve 21. But since cycle time was not reduced, capacity is increased, and mean cycle time and capacity cross at point C on curve 21. Thus, variability is reduced, mean cycle time remains the same, but throughput is increased, therefore recovering hidden capacity (an increase in factory product output).

While the concepts in FIG. 2 have been explained with reference to a simple system, these concepts are equally applicable to far more complicated queuing systems, including networks of queues with multiple servers at each station. From these relationships, one learns that in order to improve cycle time performance and reduce congestion in the fabrication process, monitoring and controlling both traffic intensity and interarrival and processing time variability is of critical importance. Both high traffic intensity and high variability result in increased factory congestion, but increasing capacity will result only from increased throughput at constraint stations. Thus, the apparatus and method in accordance with the invention are designed to target stations at or near their absolute capacity (so called constraints or bottlenecks) as well as stations with high variability where variability-reduction efforts may successfully recover "hidden" manufacturing capacity.

Figure 3:
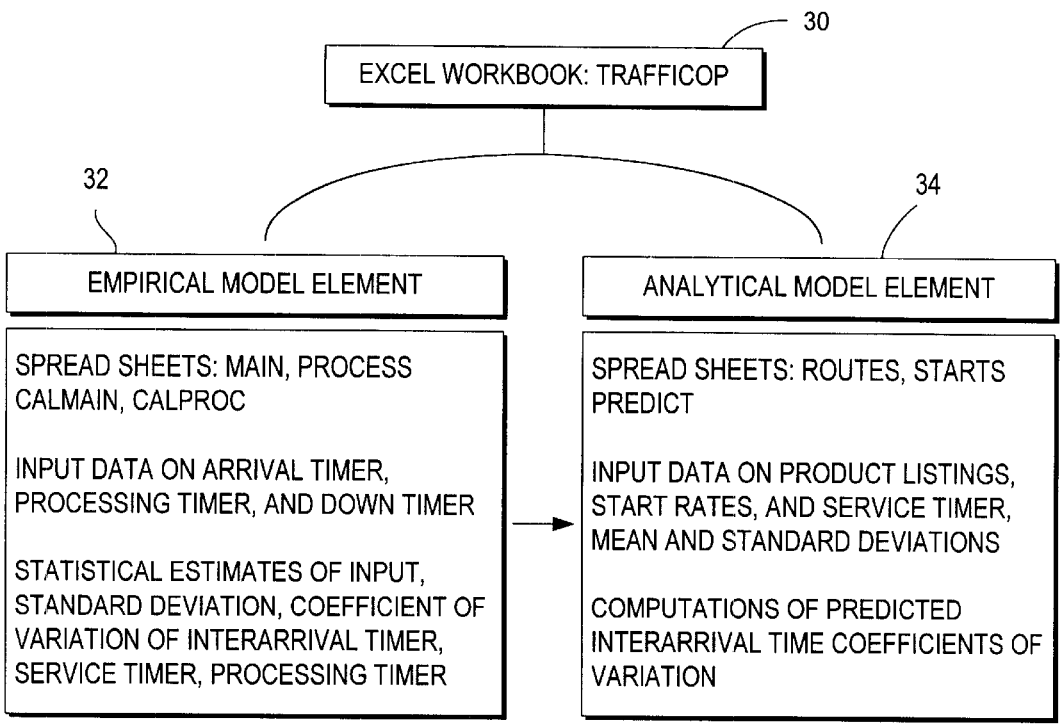
FIG. 3 is a schematic representation of the relationship between the empirical and analytical model elements in accordance with the invention.

Referring next to FIG. 3, the factory traffic monitoring and analysis apparatus constructed in accordance with the invention comprises a database 30 (in a preferred embodiment a database stored in, for example, Microsoft Excel), an empirical model element 32 and an analytical model element 34. In operation, real time data are collected from an existing shop floor control Manufacturing Execution System (MES) on interarrival times, processing times, and maintenance times. The collected data are maintained in a number of databases, stored in Microsoft Excel spreadsheets in a preferred embodiment. Empirical model element 32 performs calculations on these data to provide point and interval estimates of mean and variance of job interarrival times and service times. These are reported and serve as input to analytical model element 34, which performs calculations to estimate long-run congestion and fabrication performance.

In a preferred embodiment, the apparatus according to the invention includes various databases formatted in Microsoft Excel with macros written in Visual Basic for Applications. Of course other software may be utilized, as may hardware implementations, in alternative embodiments. The capacity of the preferred embodiment can model a silicone wafer fabrication, by way of example, having up to 200 equipment types and up to 65,000 total combined process routings. The capacity may be expanded in alternative software implementations.

Empirical model element 32 serves as a monitoring system for traffic intensity and traffic variability at the level of equipment subtype and as a parameter estimation procedure. The parameter estimates are what is exported to analytical model element 34. Equipment subtype is a group of machines with the same function in the manufacturing process. For proper modeling some equipment types are further divided in the preferred embodiment. These equipment types are divided, if there are machine location or qualification differences within the same equipment type, into subsets referred to as equipment subtypes. Raw data for use in empirical model element 32 are collected in real time from an existing shop-floor control MES system. The output of empirical model element 32 includes point and/or interval estimates of the mean, standard deviation, and coefficient of variation of job interarrival times, processing times, equipment down times, and overall service times by equipment subtype. Point estimates of the job service time parameters are exported to analytical model element 34, where they are used to predict network performance and station-level performance. Input data is continually updated in accordance with actual factory events, and thus descriptive and prescriptive information offered by the system should always be based upon the latest factory averages.

In interpreting the output from empirical model element 32, the data represent averages obtained from a dynamic manufacturing environment. Conclusions drawn from the output model should be tested with actual historical data to confirm its accuracy during actual use. During interpretation, equipment subtypes are prioritized by traffic intensity and coefficient of variation of interarrival times and service times. These values are generated using formulae as will be explained below. Equipment subtypes with traffic intensities in the range of >0.8 are considered to be heavily loaded and are thus interpreted as constraint candidates, potential capacity-limiting operations. Equipment subtypes with traffic intensities in the range of >0.5 but <0.8 are considered moderately loaded, and equipment subtypes with traffic intensities <0.5 are considered lightly loaded. Coefficients of variation above 1 are considered to be high, between 0.5 and 1 to be moderate and below 0.5 to be low.

After classification of each of the equipment subtypes, particular equipment subtypes can be flagged, and therefore be given further attention and investigated in more depth. Equipment subtypes that are both heavily loaded and have high coefficients of variation are noted as particular trouble spots in the fabrication process. In order to capture all possible capacity in the fabrication process, it is important that constraint, or bottleneck, operations have small coefficients of variation, particularly with respect to interarrival times. If the interarrival time coefficient is large, there may be frequent occurrences during the fabrication procedure where the particular operation and piece of equipment is starved for work, resulting in lost throughput and capacity.

For equipment subtypes that are only moderately or lightly loaded, eliminating sources of variability, particularly internal sources that affect processing time variability, is key because variability migrates between operations. That is, processing time variability is reflected in interarrival time variability in downstream operations. While capacity may not be lost directly at a non-constraint, or non-bottleneck, operation, if an equipment subtype with a high processing time coefficient variation feeds a constraint operation, capacity may be lost. Internal variability arises from a number of sources, including setups, batching, maintenance activities (scheduled and unscheduled), product yield, and priority jobs. By prioritizing equipment subtypes by traffic intensity and coefficients of variation, the apparatus and method in accordance with the operation can identify areas of opportunity for variability reduction and for productivity improvements.

During operation of empirical model element 32 real time data is gathered from an actual fabrication facility on lot arrivals, processing times and maintenance at each machine subtype, and by way of example only, this data is gathered at a plurality of times each day for one week. Standard statistical theory is then used to estimate means, standard deviations and confidence intervals of the means for interarrival times, processing times, and maintenance operations. These estimates are then used to compute an estimate of the mean service time for each machine, the mean service time being defined as the expected amount of time that a machine is occupied by each lot. The mean service times therefore include setup time, unsetup time and a fraction of maintenance. In a preferred embodiment, measured processing times include setup and unsetup times. Thus, to calculate an estimate of service time including processing time and a fraction of maintenance, the following expression is used:

$$E[S] = E[P] + \frac{\lambda_{maint}}{\lambda_{lots}} E[M]$$

and the variance of the service time is determined using the formula:

$$V[S] = V[P] + \left(\frac{\lambda_{maint}}{\lambda_{lots}}\right)^2 V[M]$$

Where E[S] is the estimate of the service time; E[P] is the estimate of processing time; E[M] is the estimate of maintenance time, V[S] is the estimate of the variance of the service time; V[P] is the estimate of the variance of the processing time; V[M] is the estimate of the variance of the maintenance time; $\lambda_{lots}$ is the estimate of the lot arrival rate; and $\lambda_{maint}$ is the estimate of the maintenance rate in the particular equipment subtype. The estimate of the service time is then used to estimate traffic intensity. Estimates of traffic intensity or loading factor for heavily loaded equipment subtypes during the time that data is gathered is shown, by way of example, in FIG. 4. The graph shown in FIG. 4 may be used to determined constrained, or bottleneck, equipment. Time is plotted on the x-axis and the value of the loading factor is plotted on the y-axis. Because capacity constrained equipment may change over time, the estimated loading factor for each of a plurality of equipment subtypes 42 is plotted over a plurality of days, each line 40 in FIG. 4 being the result for each equipment type 42. Thus, from the graph shown in FIG. 4, it can be determined which equipment has high loading (load factor>0.8) where the estimated loading factor is $$((\lambda)*E[S])/m$$

where m is the number of machines in the equipment subtype.

Figure 4:
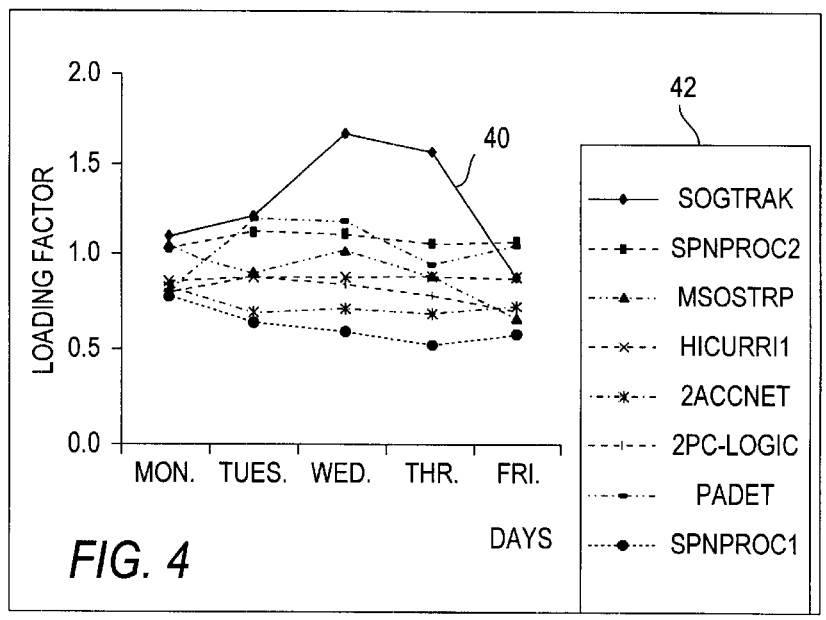
FIG. 4 is a graph depicting capacity constrained equipment.
Figure 5:
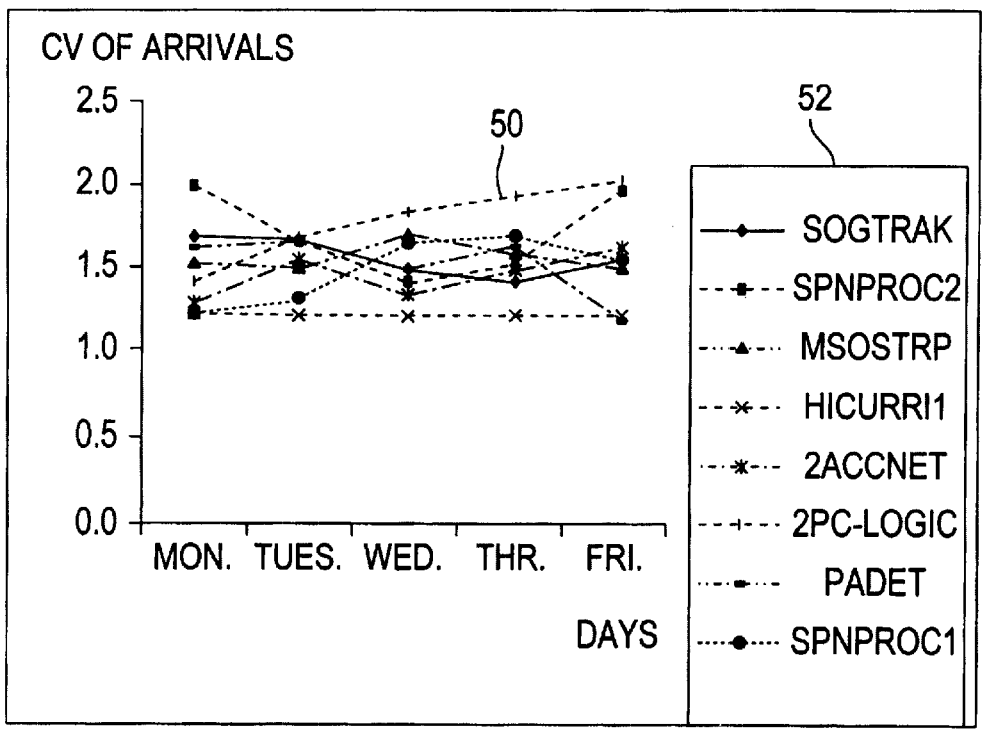
FIG. 5 is a graph depicting equipment with high traffic variability.

The next step in accordance with the invention is to identify the coefficient of variation of interarrival times ($CV_a$) for each of the highly loaded equipment subtypes, determined from FIG. 4, and for each of the equipment subtypes upstream from these highly loaded equipment subtypes. In FIG. 5, time is plotted on the x-axis and CV of Arrivals ($CV_a$) is plotted on the y-axis. As is shown in FIG. 5, a highly loaded equipment subtype 52 (FIG. 4) that shows a high coefficient of variability in interarrival times $CV_a$ (>1.0), as shown by plot 50 for each equipment subtype 52 and as calculated from the equations noted above, indicates a potential opportunity to reduce variability and recover hidden capacity. If the $CV_a$ graph in FIG. 5 for a highly loaded equipment subtype (FIG. 4) would show a low $CV_a$, this indicates that not much opportunity exists to reduce variability and recover hidden capacity for that particular equipment subtype. Therefore efforts would be focused to reduce variability and recover hidden capacity from highly loaded equipment subtypes having high $CV_a$.

Reducing variability in highly loaded equipment with high $CV_a$ allows for a recovery of hidden capacity. Because hidden capacity is being recovered at the so-called bottleneck of a manufacturing line, the number of products that can be manufactured, and thus the throughput of the manufacturing line can be increased. Thus, product output can be increased while maintaining the same lead time and without adding new, additional equipment.

Figure 6:
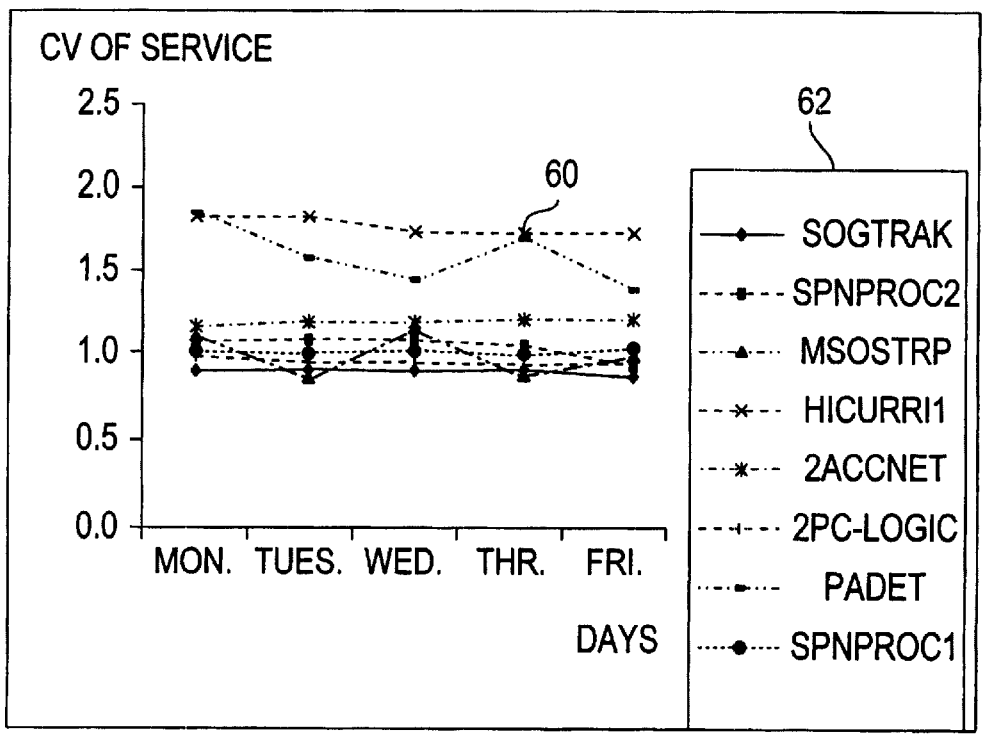
FIG. 6 is a graph depicting equipment with high service variability.

A high coefficient of variability of interarrival times ($CV_a$) is often generated by a high coefficient of variation of service ($CV_s$) of equipment upstream in the manufacturing process. High variation in work methods, process times, or maintenance events in the equipment upstream from a highly loaded equipment subtype creates a high $CV_s$ upstream, which may in turn create a high $CV_a$ downstream. FIG. 6 depicts equipment subtypes 62 with high service variability as shown for each plot 60 for each equipment subtype 62, as calculated from the above equations. In FIG. 6, time is plotted on the x-axis and CV of service ($CV_s$) is plotted on the y-axis.

In most manufacturing operations, because of re-entrant flows and position of the equipment, where often much equipment is upstream of a heavily loaded equipment subtype, reducing the $CV_s$ of any equipment subtype contributes to overall improvements in factory performance. However, in order to determine where efforts might be best spent, i.e. which reductions in variability will result in the greatest improvement in overall factory performance, analytical model element 34 is used. Through analytical model element 34, it will be possible to determine which coefficient of variation changes will result in the greatest improvement in factory performance.

Analytical model element 34 predicts where congestion in a fabrication process will occur (because of high traffic intensity and/or high variability, as calculated by empirical model element 32) for a given amount of products started to be fabricated in a fabrication system. Thus, in accordance with the invention, a user inputs to analytical model element 34 a number of job starts (either measured, desired, or hypothetical). Analytical model element 34 then calculates approximations of the steady-state traffic intensity, coefficient of variation of arrivals, and mean cycle time at each station. These calculations are performed using information on product routes and parameter estimates of service times for each equipment subtype for empirical model element 32. Analytical model element 34 approximates stationary, steady-state traffic flows. These are long run performance measures assuming the fabrication process produces an unchanging mix of product; i.e. input and output product requirements are fixed. Of course, in reality, a fabrication process and factory is a dynamic environment whose day to day operations may vary greatly. Thus, analytical model element 34 acts as a predictor of long run traffic characteristics and mean queuing behavior throughout the fabrication process and factory.

Analytical model element 34 employs queuing network approximations, as discussed in W. Whitt, "The queuing network analyzer," The Bell Systems Technical Journal, vol. 62, pp. 2779–2815, 1983. The approximations are used to compute steady-state traffic intensities and arrival coefficients of variation at all equipment subtypes. Analytical model element 34 treats each equipment subtype as a node in a network of queues. Product flows between nodes according to a routing matrix determined by actual product flow and processing requirements from an actual or hypothetical factory floor. The $(i,j)^{th}$ element in the routing matrix $(q_{ij})$ gives the proportion of product leaving equipment subtype i that next visits equipment subtype j. The routing matrix will contain contributions from all products being produced in a particular fabrication facility of process. Given the routing matrix and a collection of external arrival rates, analytical model element 34 solves for (1) Mean Job Flow, and (2) Variability propagation, each of which involves solving a set of simultaneous linear equations. Mean Job Flow determines the long term arrival rates to all nodes in the network, while Variability propagation determines the interarrival coefficients of variation for all nodes in the network. In these equations, n=number of equipment subtypes in the factory; $m_i$=number of machines in equipment subtype i; $CVa_i$=Coefficient of variation of arrivals to i; $r_i = \lambda_i E[S]/m_i$, utilization of i; $CVs_i$=Coefficient of variation of service at i; $p_{ij}$=proportion of all arrivals from i to j; and i=0 means input from outside.

The equations that are solved, in accordance with the invention are as follows:

Mean Job Flow Equations $$\lambda_j = \lambda_{0j} + \sum_{i=1}^{n} \lambda_i q_{ij}$$

where $\lambda_{Oj}$=the long run arrival rate of jobs to station j from outside the network.

Variability Propagation Equations $$CV_{A_j}^2 = a_j + \sum_{i=1}^{n} CV_{A_i}^2 b_{ij}$$

Where, $$a_j = 1 + w_j \left( (p_{0j} CV_{Ao_j}^2 - 1) + \sum_{i=1}^{n} p_{ij}((1 - q_{ij}) + q_{ij} r_i^2 x_i) \right)$$

$b_{ij} = w_j p_{ij} q_{ij}(1 - r_i^2)$ $x_i = 1 + m_i^{-0.5}(\max\{CV_s^2, 0.2\} - 1)$ $w_j = (1 + 4(1 - r_j)^2(v_j - 1))^{-1}$ $$v_j = \left( \sum_{i=0}^{n} p_{ij}^2 \right)^{-1}$$

Solving the Variability Propagation equations first requires the solution of the Mean Job Flow Equations. The approximations resulting from the application of these equations can be validated by direct comparison with parameter estimates obtained from historical observations, i.e. the equations can be tested using known historical data.

Figure 7:
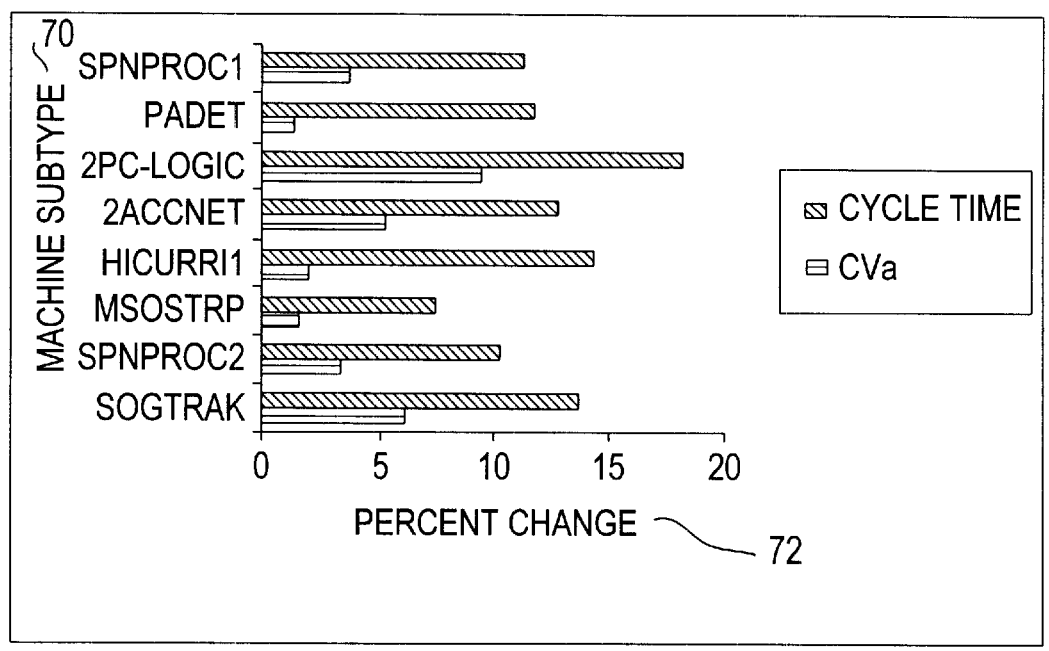
FIG. 7 is a graph depicting the impact of a reduction in service variability.

Once the Mean Job Flow and Variability Propagation equations have been solved, estimates of mean and coefficient variation of service times obtained from empirical model element 34 are used to compute performance estimates for traffic intensities and mean cycle times using the Kingman diffusion approximation, as known in the art and as noted above. By way of example, the predictive capability of the factory traffic monitoring and analysis apparatus and method in accordance with the invention may be demonstrated by assessing the impact on the manufacturing process of a reduction of all of the CVs by 10%. Analytical model element 34 is used to calculate changes in product output as a result of these changes in CVs. FIG. 7 is a graph depicting the effect that the reduction of all CVs by 10% had on $CV_a$'s for each particular machine by percentage. In FIG. 7, machine subtype 70 is shown on the y-axis, and percentage change in $CV_a$ 72 for each equipment subtype 70 is shown on the x-axis. Machines identified as heavily loaded subtypes by empirical model element 32 are shown.

After these determinations of changes in $CV_a$ have been made, the Kingman diffusion approximation is then used to assess the effect that this improvement has on the cycle time for each machine subtype. These values are also shown in FIG. 7, as noted above. These changes in cycle time values range from approximately 8% to approximately 18%. While these values may not seem like very much, because the reduction is taking place at the heavily loaded stations or possible bottlenecks, the changes will be transferred to a real overall average reduction in processing time products in the production facility or process.

Thus, the factory traffic monitoring and analysis apparatus and method in accordance with the invention allows production operations management to identify stations limiting line production capacity or with high flow variability. By focusing efforts on improving the capacity of the identified stations or reducing variability, an increase in product output by recovering hidden capacity at low cost while reducing or maintaining low manufacturing lead times is possible. Additionally, the factory traffic monitoring and analysis apparatus and method in accordance with the invention may be used as a predictive planning tool allowing quick evaluation of the impact of proposed production changes or evaluation of the impact of proposed continuous improvement efforts to reduce variability.

What is claimed is:

1. A factory traffic monitoring method, comprising the steps of:

measuring at least interval times, processing times, and maintenance times of various pieces of equipment in a factory:

calculating point and interval estimates of mean and variance values of job interarrival times and service times for said equipment;

determining which of said various pieces of equipment have a high load factor;

determining a coefficient of variation of interarrival times for each of said pieces of equipment having a high load factor; and identifying pieces of equipment for which variation in interarrival times should be reduced.

2. The method of claim 1, wherein the variation in interarrival times is reduced by reducing a variation in service time of a piece of upstream equipment.

3. The method of claim 2, wherein the aforesaid steps are performed a plurality of times after each time at least one reduction in the service time has been performed.

4. The method of claim 1, further comprising the step of:

modifying said calculated point and interval estimates so that the results of these modifications on the factory can be determined.

5. The method of claim 1, further comprising the step of determining an estimate for mean service time and variance of service time for each group of pieces of equipment.

6. The method of claim 5, wherein the estimate of mean service time is calculated according to the formula:

$$\overline{E[S]} = \overline{E[P]} + \frac{\overline{\lambda}_{ma\,int}}{\overline{\lambda}_{lots}} \overline{E[M]}$$

where E[S] is the estimate of service time, E[P] is an estimate of processing time, E[M] is an estimate of maintenance time, $\lambda_{maint}$ is an estimate of the maintenance rate for a particular equipment, and $\lambda_{lots}$ is an estimate of a lot arrival rate.

7. The method of claim 6, wherein said load factor is determined in accordance with the formula $$((\lambda)*\overline{E[S]})/m$$

where $\lambda$ is the load factor, E[S] is the estimate of service time, and m is the number of machines constituting the group of equipment.

8. The method of claim 5, wherein the estimate of the variance of the service time is calculated according to the formula:

$$\overline{V[S]} = \overline{V[P]} + \left(\frac{\overline{\lambda}_{ma\,int}}{\overline{\lambda}_{lots}}\right)^2 \overline{V[M]}$$

and V[S] is the estimate of the variance of the service time, V[P] is an estimate of the variance of the processing time, V[M] is an estimate of the variance of the maintenance time, $\lambda_{maint}$ is an estimate of the maintenance rate for a particular equipment, and $\lambda_{lots}$ is an estimate of a lot arrival rate.

9. The method of claim 1, further comprising the step of reducing said coefficient of variations in each identified piece of equipment.

10. The method of claim 9, wherein the aforesaid steps are performed a plurality of times after each time at least one coefficient of variations has been reduced.

11. A factory traffic monitoring system, comprising:

means for measuring at least interval times, processing times, and maintenance times of various pieces of equipment in a factory:

means for calculating point and interval estimates of mean and variance values of job interarrival times and service times;

means for determining which of said various pieces of equipment have a high load factor;

means for determining a coefficient of variation of interarrival times for each of said pieces of equipment having a high load factor; and means for identifying pieces of equipment for which variation in interarrival times should be reduced.

12. The system of claim 11, wherein the variation in interarrival times is reduced by reducing a variation in service time of a piece of upstream equipment.

13. The system of claim 12, wherein all of said means operate a plurality of times after each time at least one reduction in the service time has been performed.

14. The system of claim 11, further comprising means for modifying said calculated point and interval estimates so that the results of these modifications on the factory can be determined.

15. The system of claim 11, further comprising means for determining an estimate for mean service time and variance of service time for each group of equipment.

16. The system of claim 15, wherein the estimate of mean service time is calculated according to the formula:

$$\overline{E[S]} = \overline{E[P]} + \frac{\overline{\lambda}_{ma\,int}}{\overline{\lambda}_{lots}} \overline{E[M]}$$

and E[S] is the estimate of service time E[P] is an estimate of processing time, E[M] is an estimate of maintenance time, $\lambda_{maint}$ is an estimate of the maintenance rate for a particular equipment and $\lambda_{lots}$ is an estimate of a lot arrival rate.

17. The system of claim 16, wherein said load factor is determined in accordance with the formula $$((\lambda)*\overline{E[S]})/m$$

where $\lambda$ is the load factor, E[S] is the estimate of service time, and m is the number of machines constituting the group of equipment.

18. The system of claim 15, wherein the estimate of the variance of the service time is calculated according to the formula:

$$\overline{V[S]} = \overline{V[P]} + \left(\frac{\overline{\lambda}_{ma\,int}}{\overline{\lambda}_{lots}}\right)^2 \overline{V[M]}$$

and V[S] is the estimate of the variance of the service time, V[P] is an estimate of the variance of the processing time, V[M] is an estimate of the variance of the maintenance time, $\lambda_{maint}$ is an estimate of the maintenance rate for particular equipment, and $\lambda_{lots}$ is an estimate of a lot arrival rate.

19. The system of claim 11, further comprising means for reducing said coefficient of variations in each identified piece of equipment.

20. The method of claim 19, wherein all of said means operate a plurality of times after each time at least one coefficient of variations has been reduced.

* * * * *